United States Patent [19]

Hehl

[11] Patent Number: 4,775,309

[45] Date of Patent: Oct. 4, 1988

[54] INJECTION MOLDING MACHINE WITH DATA DISPLAY DEVICE

[76] Inventor: Karl Hehl, Artur-Hehl-Strasse 32, D-7298 Lossburg 1, Fed. Rep. of Germany

[21] Appl. No.: 99,260

[22] Filed: Sep. 21, 1987

[30] Foreign Application Priority Data

Sep. 24, 1986 [DE] Fed. Rep. of Germany ....... 3632449

[51] Int. Cl.⁴ .................... B29C 45/76; B29C 45/17
[52] U.S. Cl. .................. 425/135; 164/150; 164/154
[58] Field of Search ............... 425/135, 169, 542, 190, 425/195; 164/150, 154

[56] References Cited

U.S. PATENT DOCUMENTS

| Re. 32,596 | 2/1988 | Kindlmann et al. | 164/150 |
| 3,909,172 | 9/1975 | Collins | 164/154 |
| 4,522,247 | 6/1985 | Ungarean et al. | 164/150 |

OTHER PUBLICATIONS

Von Yvonne Attiyate, "Multi-Mikroprozessorsystem mit Farbmonitor", Kunststoffe-Plastics 6/1983, pp. 22-24.

Primary Examiner—Willard Hoag
Attorney, Agent, or Firm—Spencer & Frank

[57] ABSTRACT

An injection molding machine includes a machine bed having a support face and a vertical side wall; a mold closing unit mounted on the support face; an injection molding unit mounted on the support face; a computer; a data display device spaced from the computer accessible by operating personnel in a service location laterally adjacent the machine; and a vertical slide panel mounted on the vertical wall. The vertical slide panel and the vertical wall constitute a partition separating a service zone from a danger zone. A vertical carrier column is supported adjacent the carrier block of the injection molding unit on the vertical wall of the machine bed; and a protective door is supported by the vertical carrier column and is arranged for displacement in a travelling path parallel to the injection axis. The protective door is arranged for shielding a frontal side of the injection molding unit. The protective door has a closed position in which it is immediately adjoining a service keyboard mounted adjacent the protective side panel. A pivotal arm is swingably secured to the vertical carrier column and carries the data display device. The pivotal arm has a first position in which it holds the data display device in a position of rest vertically above the support face of the machine bed clear of the service zone and a second position in which the pivotal arm holds the data display device in a working position in the service zone.

16 Claims, 12 Drawing Sheets

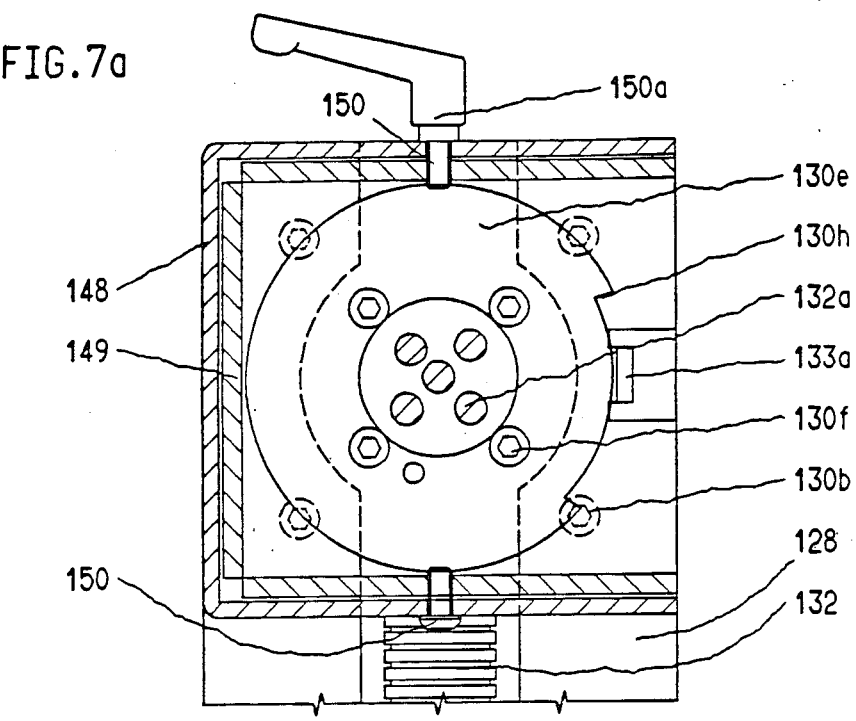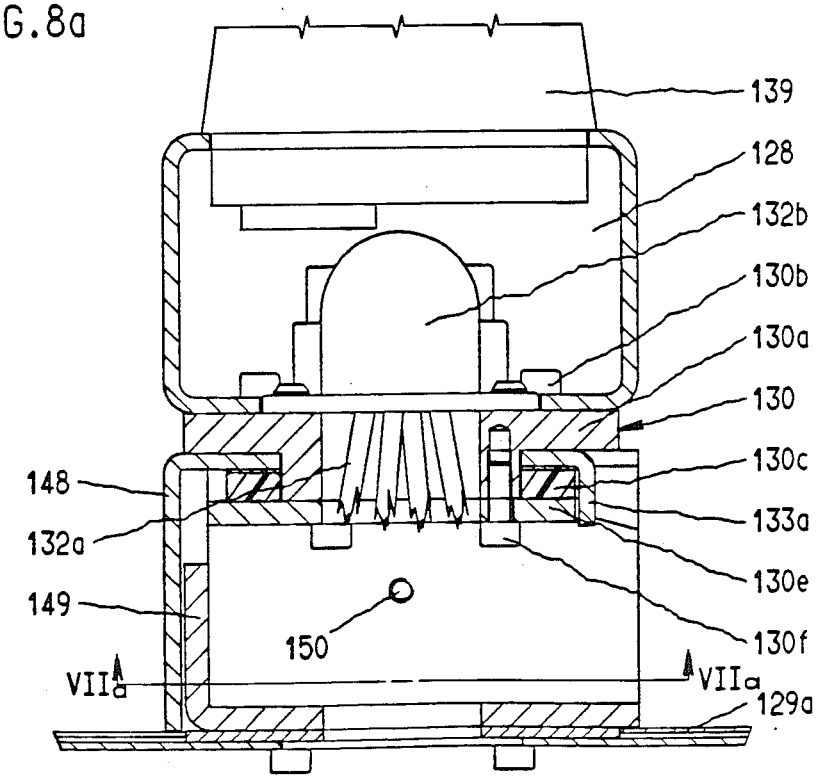

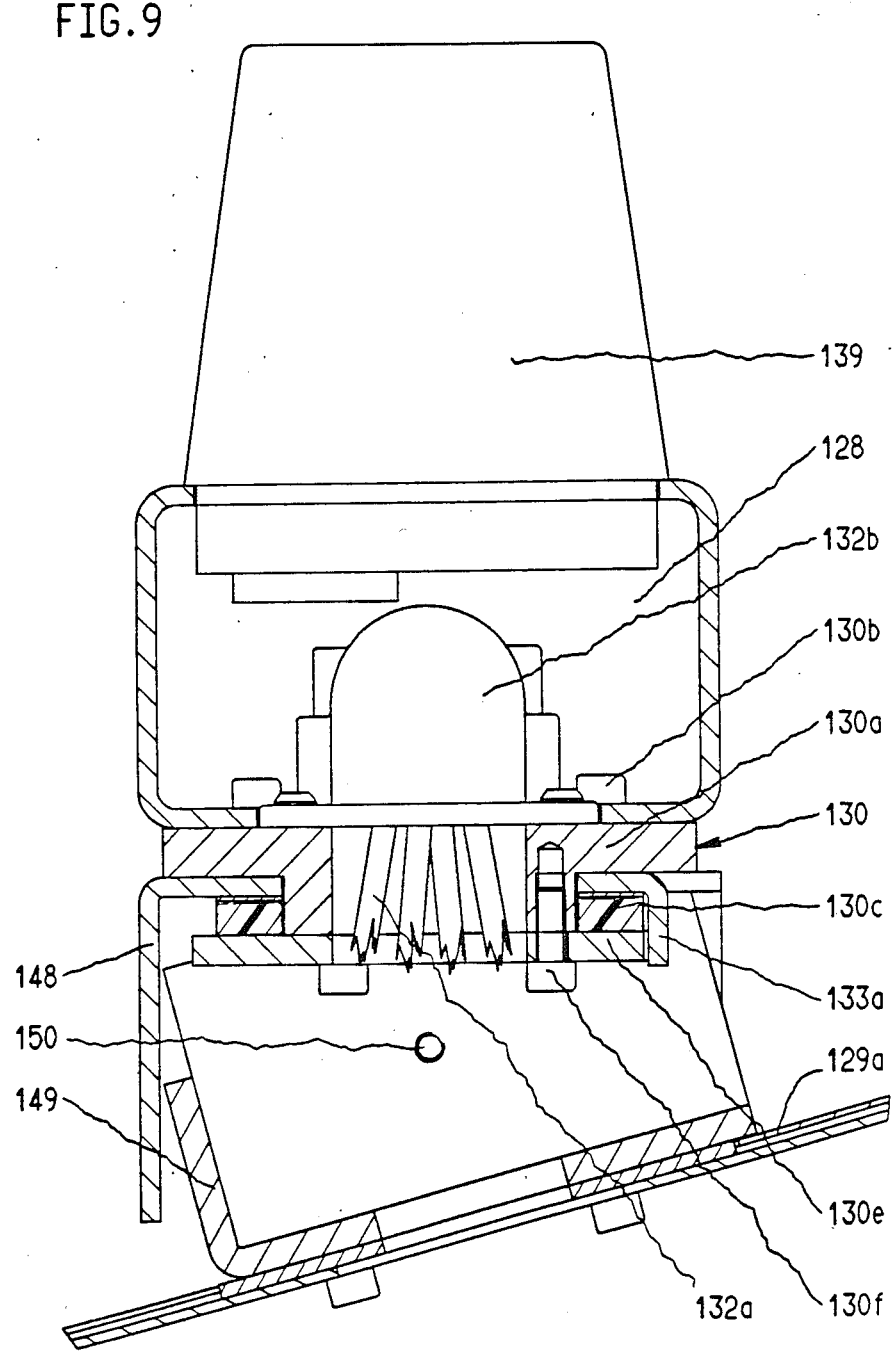

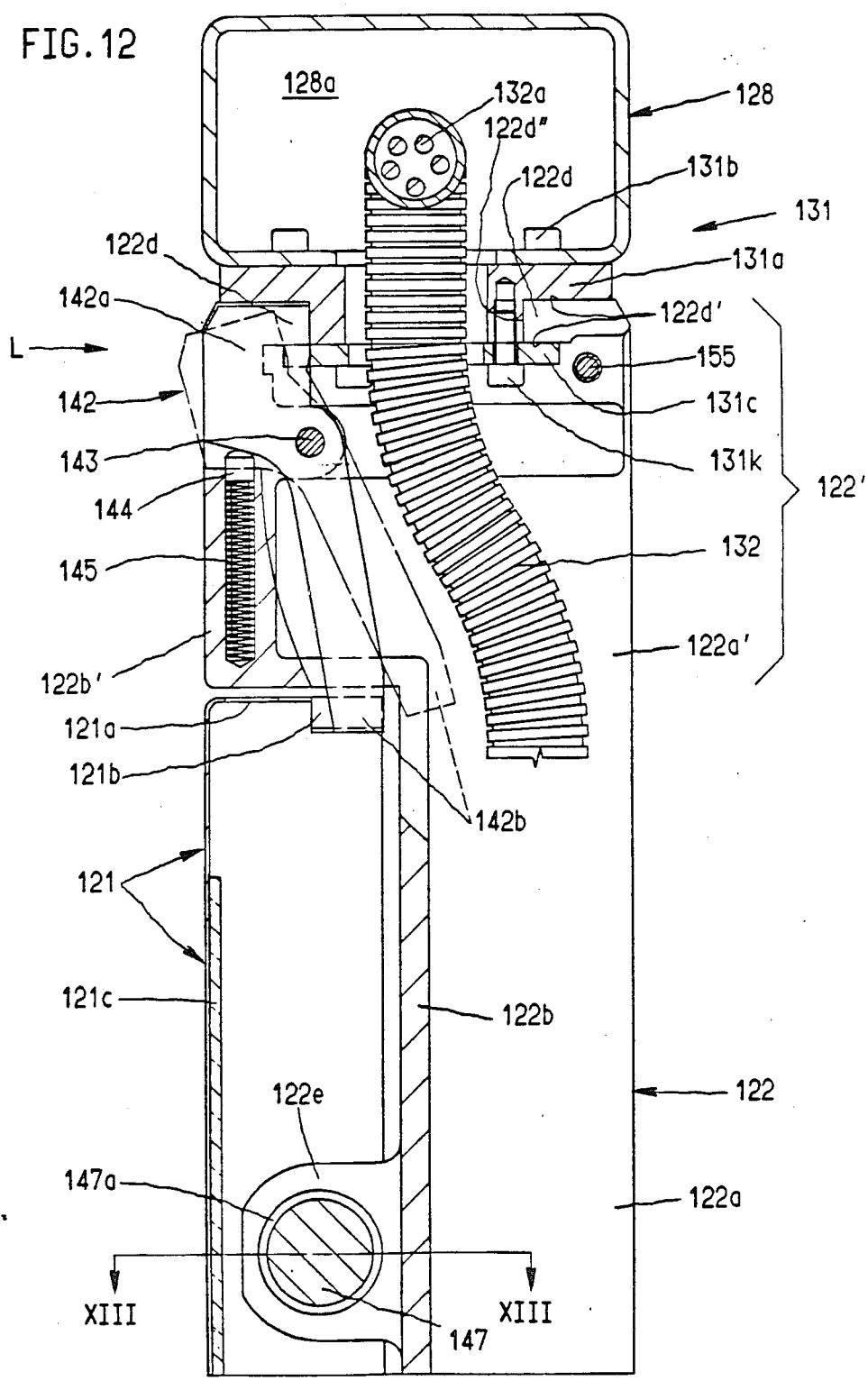

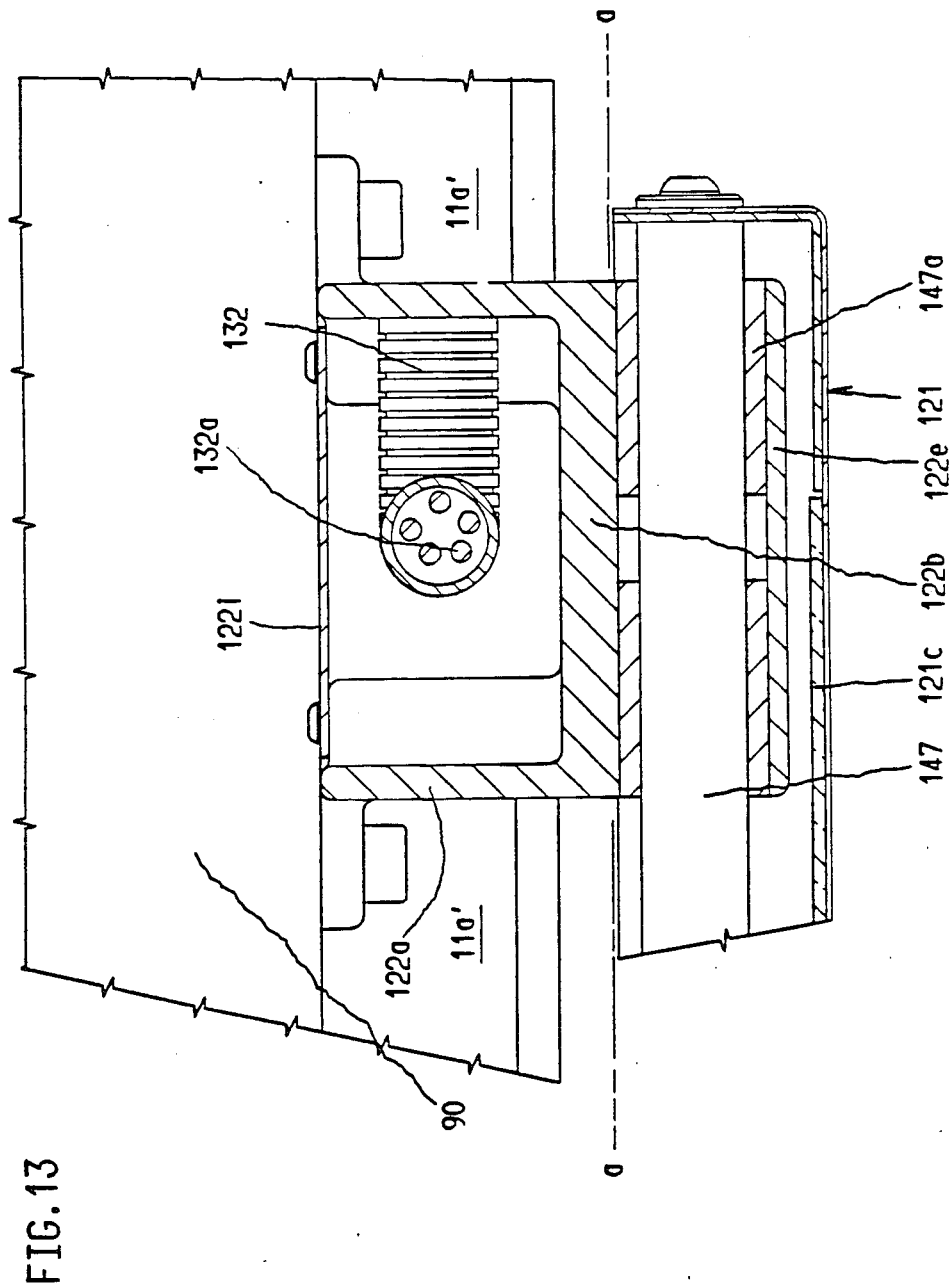

INJECTION MOLDING MACHINE WITH DATA DISPLAY DEVICE

BACKGROUND OF THE INVENTION

This invention relates to an injection molding machine which has a block-shaped machine bed provided with an approximately rectangular, generally horizontal top support face on which there is arranged an injection molding unit as well as a mold closing unit which executes its opening and closing motions in a horizontal direction. The injection molding unit includes a carrier block which receives a plasticizing cylinder and a drive assembly. With the injection molding machine there is associated a computer as well as a data display device which is spaced from the computer. The display device has a keyboard accessible from a service location situated in a service zone of the injection molding machine. The service zone is separated from a danger zone—which includes the injection mold assembly—by a service-side vertical wall of the machine bed and at least one vertical protective slide panel arranged on the vertical wall.

In an injection molding machine of the above-outlined type the data display device and the keyboard are spatially separated from the computer of the injection molding machine. Such a solution means a break-up of the conventional structural unit formed by the circuitry cabinet, the data display device and the keyboard. The freeing of the circuitry cabinet from the keyboard has, among others, the advantage that the computer can be hermetically enclosed in the cabinet, such as disclosed in an article in the periodical *Kunststoffe-Plastiks,* volume 6/83, entitled "Multi-microprocessor System with Color Monitor".

SUMMARY OF THE INVENTION

It is an object of the invention to provide an injection molding machine of the above-outlined type with a view towards a service-friendly integration of the service keyboards and the data display device in a service location which is situated in the service zone approximately at the height of the nozzle-side portion of the plasticizing cylinder. This arrangement should be such that, on the one hand, the data input keyboard of the data display device situated closely in the range of vision and the manual service keyboard are accessible for a direct interference with the process control from the service location, for example, for the purpose of eliminating operational disturbances and, on the other hand, the service zone may be made clear of the data display device by a single motion of the hand.

This object and others to become apparent as the specification progresses, are accomplished by the invention, according to which, briefly stated, a vertical carrier column is supported adjacent the carrier block of the injection molding unit on the vertical wall of the machine bed; and a protective door is supported by the vertical carrier column and is arranged for displacement in a travelling path parallel to the injection axis. The protective door is arranged for shielding a frontal side of the injection molding unit. The protective door has a closed position in which it is immediately adjoining a service keyboard mounted adjacent the protective side panel. A pivotal arm is swingably secured to the vertical carrier column and carries the data display device. The pivotal arm has a first position in which it holds the data display device in a position of rest vertically above the support face of the machine bed clear of the service zone and a second position in which the pivotal arm holds the data display device in a working position in the service zone.

In an injection molding machine according to the invention as outlined above, there are provided the basic preconditions that the danger zone and the service zone may be extended as a stretched-out danger zone and a stretchedout service zone, while ensuring a satisfactory mutual separation in case a plurality of injection molding machines are arranged in a mirror symmetry on both sides of a rail on which a carriage may travel. The carriage and a stationary storage magazine for the molds together constitute a mold changing assembly. In such a case, the service-side vertical walls of the machine beds of the end-to-end arranged injection molding machines, taken in conjunction with the protective slides and protective doors arranged on the vertical walls, form a more or less closed boundary between the service alley extending along the length of the rail and the danger zone formed of the rail itself and the injection molding machines situated on either side of the rail in a mirror image arrangement. In this connection, reference is made to co-pending application to Karl Hehl, Ser. No. 51,387 filed May 19, 1987.

After operational shutdown, the service alleys may be cleaned and cleared with cleaning devices in a relatively short period of time.

BRIEF DESCRIPTION OF THE DRAWING

FIG. 7a is a sectional view taken along line VIIa—VIIa of FIG. 8a.

FIG. 8a is a sectional view of a further component of the preferred embodiment.

FIG. 9 is a view similar to FIG. 8, showing the data display device in a different pivoted position.

FIG. 12 is a sectional view taken along line XII—XII of FIG. 11.

FIG. 13 is a sectional view taken along line XIII—XIII of FIG. 12.

DESCRIPTION OF THE PREFERRED EMBODIMENT

Figure 3:
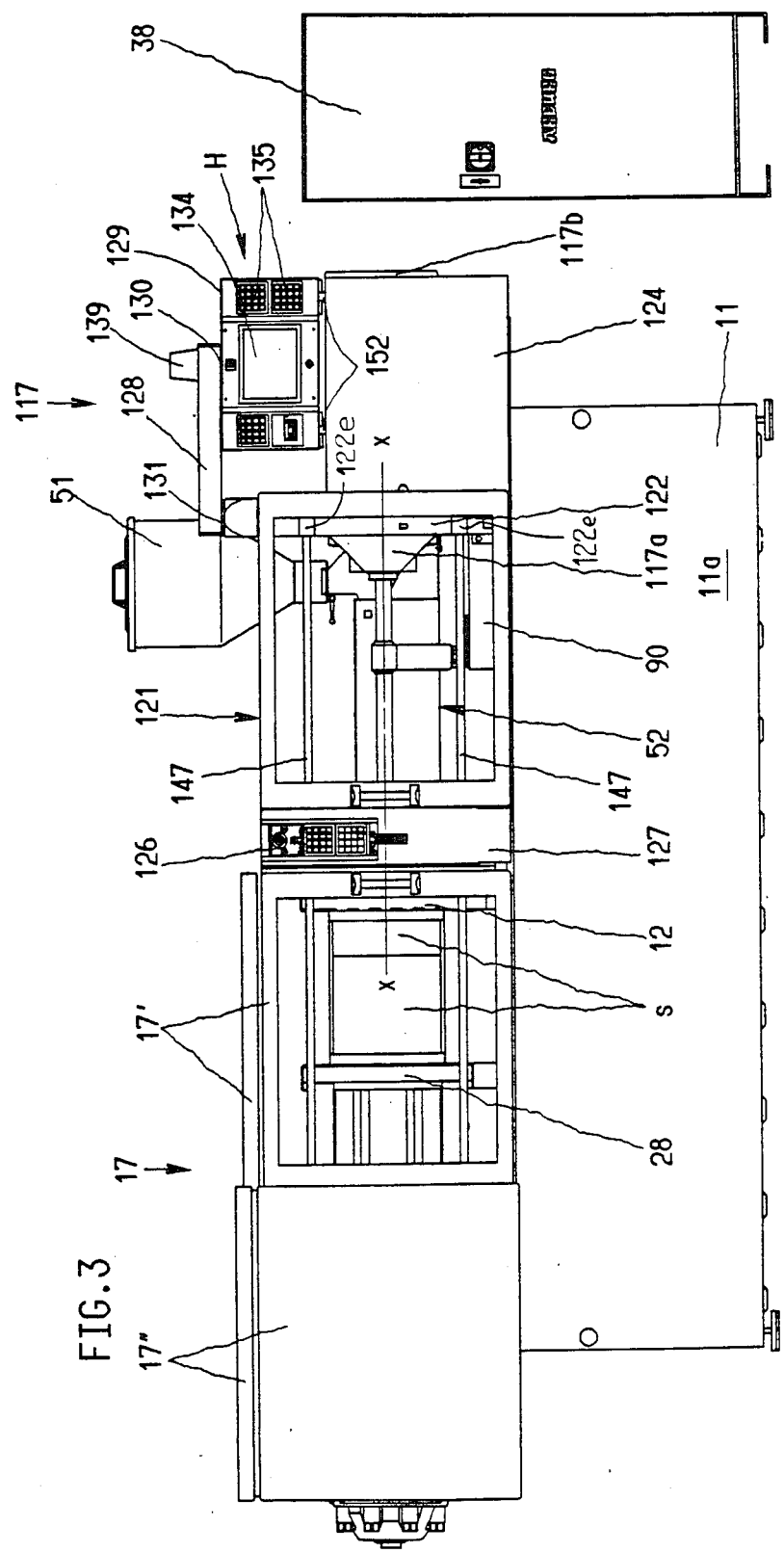
FIG. 3 is a schematic side elevational view of an injection molding machine incorporating a preferred embodiment of the invention.
Figure 4:
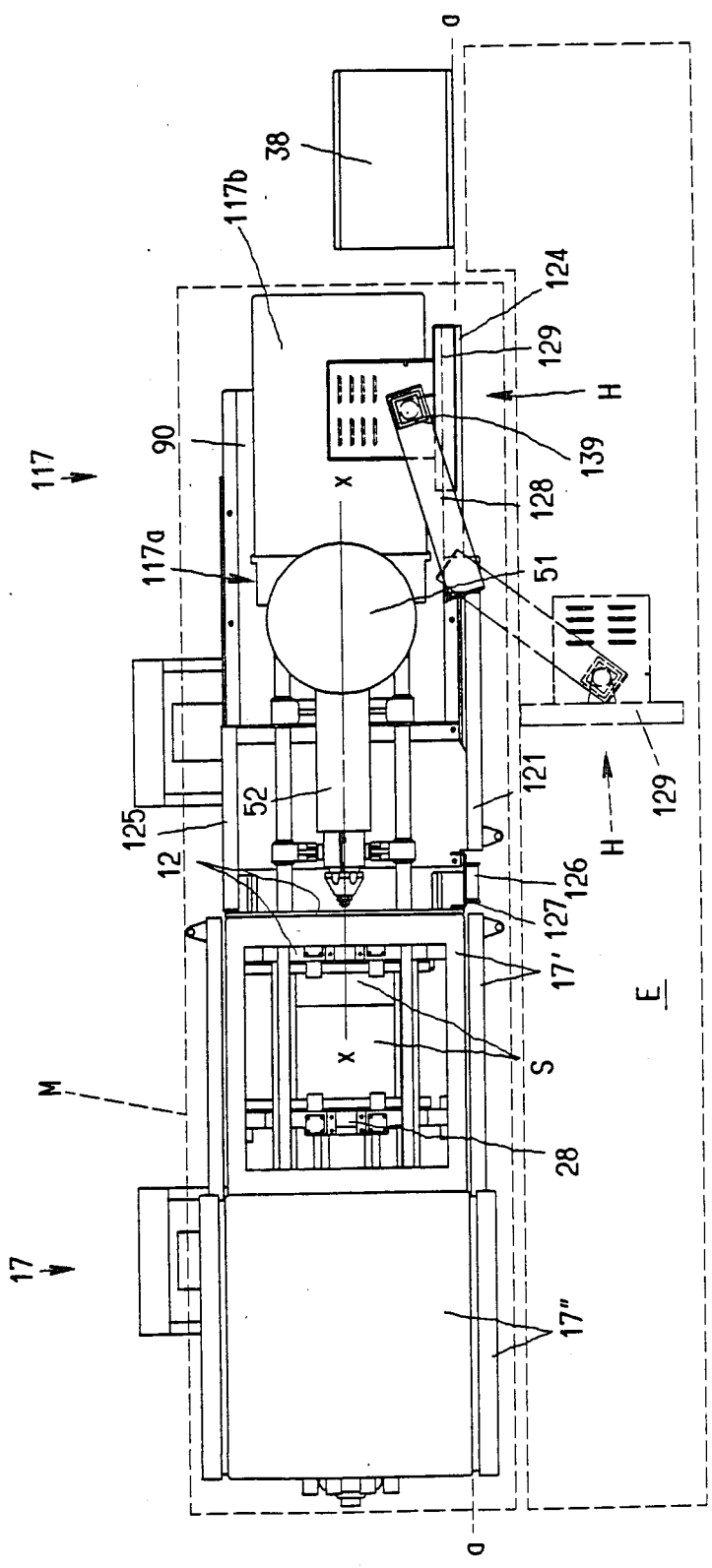
FIG. 4 is a top plan view of the structure shown in FIG. 3.
Figure 5:
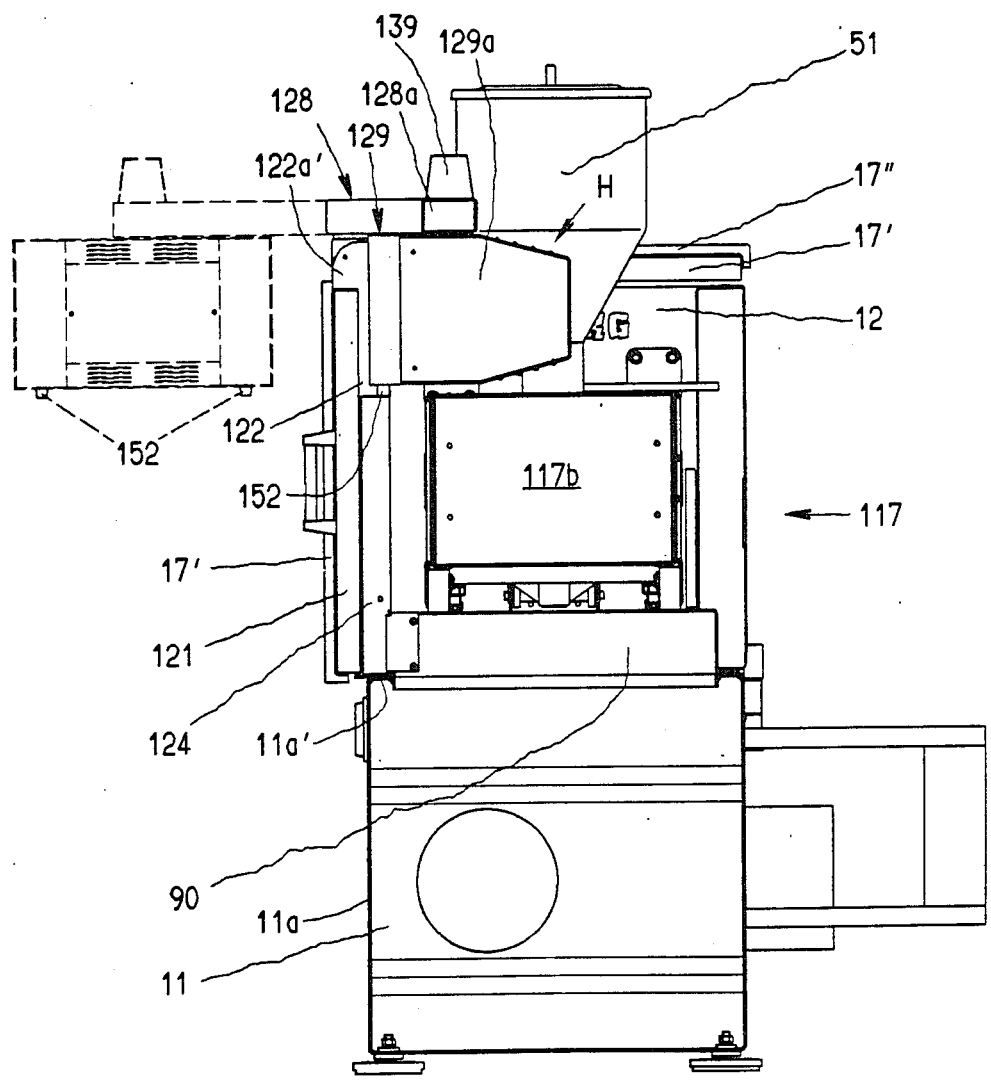
FIG. 5 is a front elevational view of the structure shown in FIG. 3.

With reference to FIGS. 3, 4 and 5, the injection molding machine shown therein has a mold closing unit 17 which executes opening and closing motions in a horizontal direction, and an injection molding unit 117 arranged on a block-shaped machine bed 11 having a rectangular supporting face M. The injection molding unit 117, whose plasticizing cylinder 52 has an injection axis x—x is displaceable by means of a carrier block 117a on stationary horizontal columns for being operatively joined to or separated from an injection mold assembly S immobilized in the mold closing (mold clamping) unit 17. A protective casing 117b of rectangular cross section encloses the injection molding unit 117 in the zone of its drive assembly. The drive assembly for the movable mold carrier 28 is covered by stationary protective closures 17" into which protective slides 17' may be introduced which cover the mold closing unit 17 up to the stationary mold carrier 12.

Figure 1:
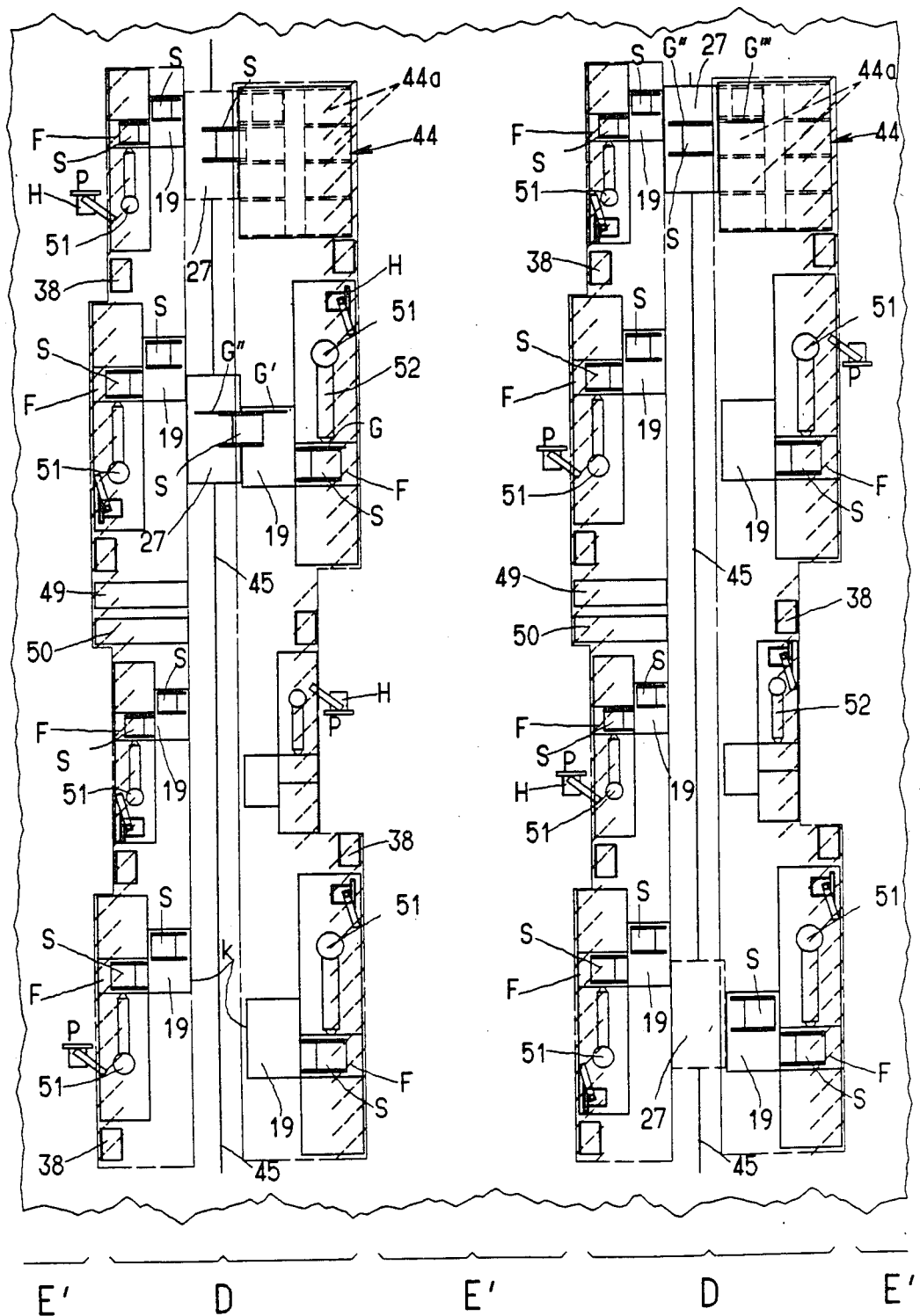
FIG. 1 is a schematic top plan view of a plurality of injection molding machines grouped to form an injection molding plant, incorporating the invention.
Figure 2:
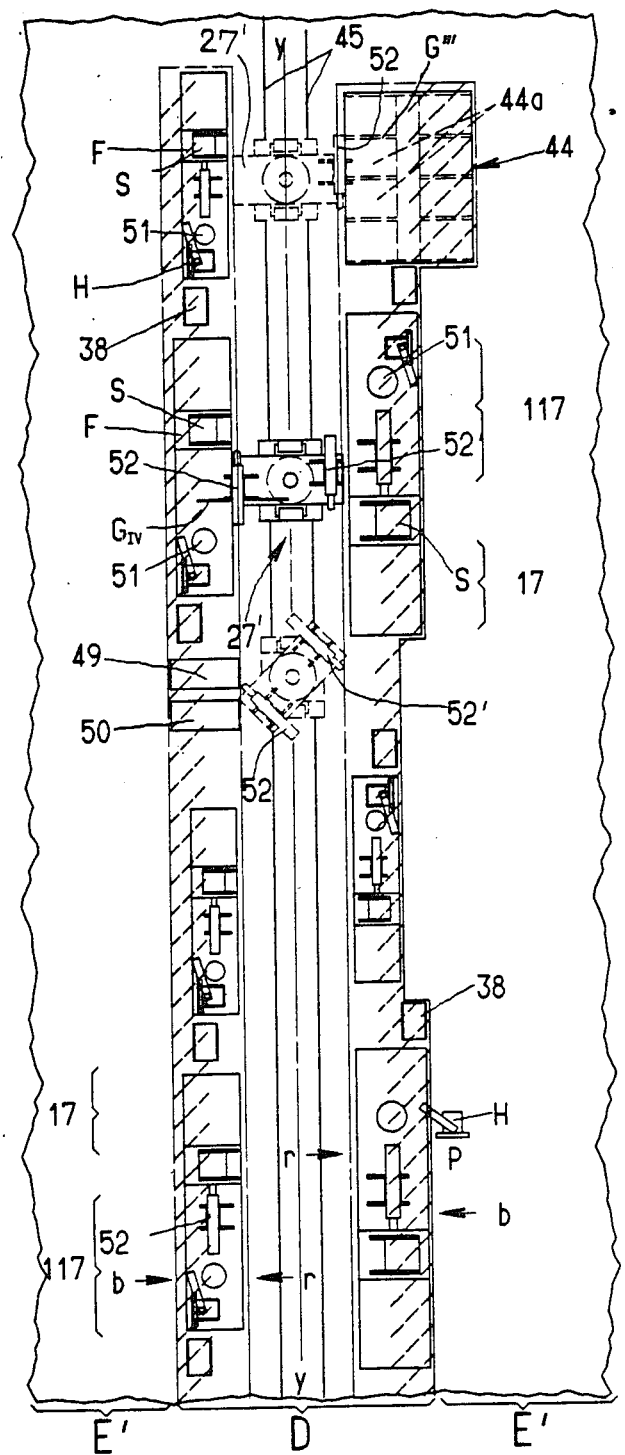
FIG. 2 is a schematic top plan view of a modified injection molding plant similar to FIG. 1.

Also referring to FIGS. 1 and 2, a data display device H is, by means of a horizontal pivotal arm 128, swingable from a position of use in a service zone E into a position of rest situated within the supporting face M of the injection molding machine and conversely. Also referring to FIG. 13, the pivotal arm 128 is swingably supported on a carrier column 122 which, in turn, is held on a horizontally bent upper edge 11a' of a service-side vertical wall 11a of the sheet metal machine bed 11.

In the position of rest the data display device H, with its housing 129a containing the electronic components of the data display device H, extends over the horizontal wall of the protective cover 117b. The screen 134 of the data display device H, flanked by lateral keys 135, is arranged in a rectangular frame 129 as seen in particular in FIG. 6. The height of the frame 129 corresponds approximately to the height of the housing 129a as shown in particular in FIGS. 5 and 6. The data display device H is connected with the pivotal arm 128 by means of a rotary bearing 130 as seen in FIGS. 3–9. The rotary bearing 130 comprises a bearing ring 130a of the pivotal arm 128 and an abutment disc 130e secured to the bearing ring 130 as well as a damping element 130c. The securing screws are designated at 130b and 130f. In the embodiment shown in FIGS. 3–8, the upper wall of the housing 129a is directly rotatably supported by the damping element 130c on the abutment disc 130e. In FIGS. 7a, 8a and 9 there is shown a rotary-and-pivotal connection of the data display device H with the pivotal arm 128 wherein between the upper wall 129a' of the housing 129a and the rotary bearing 130 there is inserted a pivotal device which makes it possible to swing to a limited extent the data display device H, rotatable by means of the rotary bearing 130, on a pivot pin 150 extending parallel to the frontal wall of the data display device H. The pivotal device includes a pivotal bearing member 149 by means of which the data display device H is supported on the pivot pin 150. The latter is received in a bearing member 148 which extends behind the damping element 130c of the rotary bearing 130.

Figure 6:
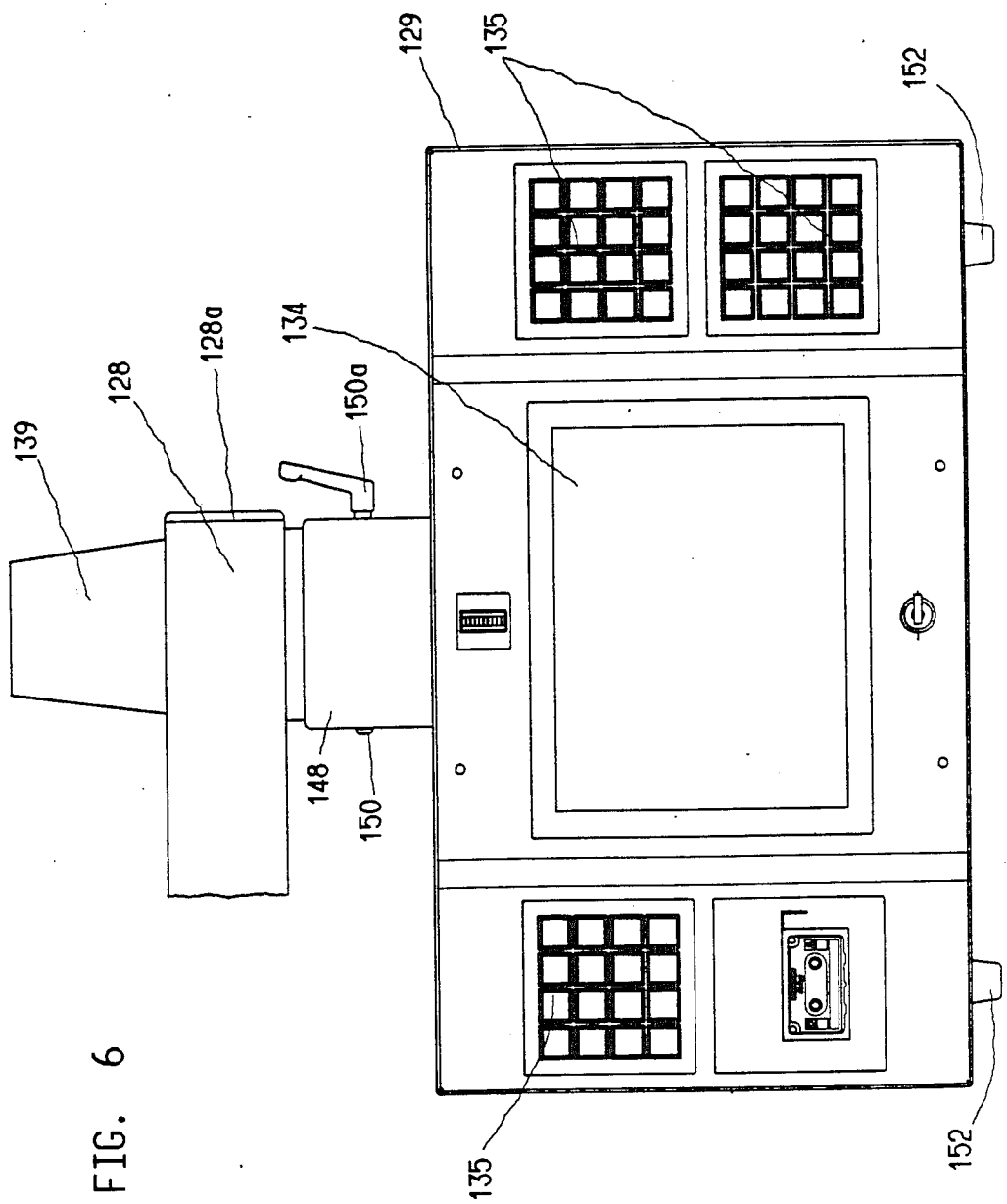
FIG. 6 is a schematic front elevational view of components of the preferred embodiment.
Figure 7:
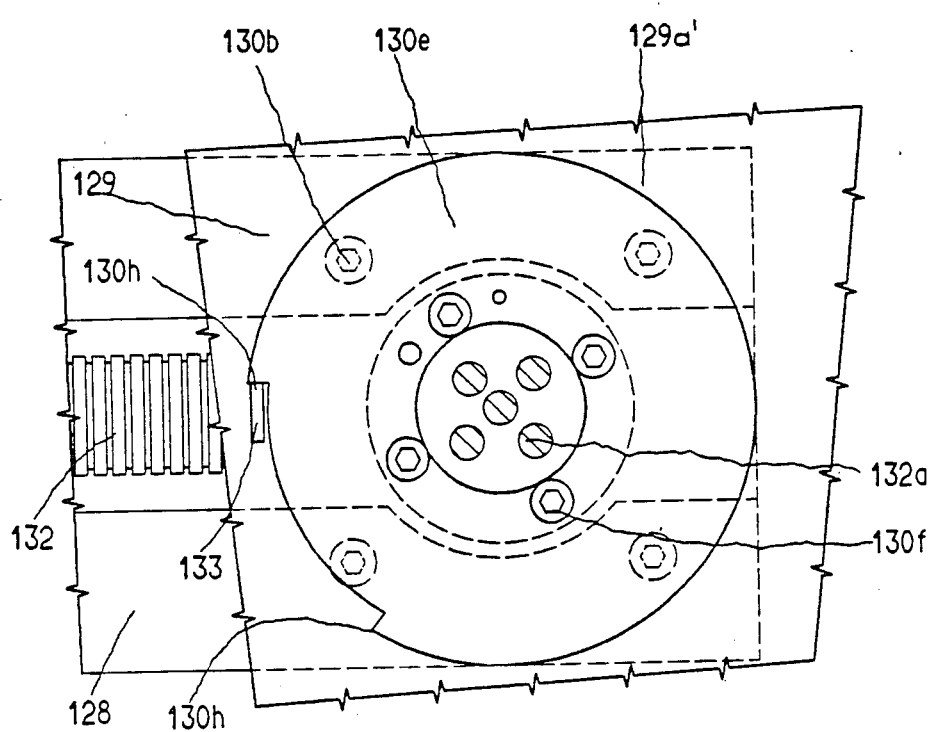
FIG. 7 is a view taken in the direction of arrow A of FIG. 8.
Figure 8:
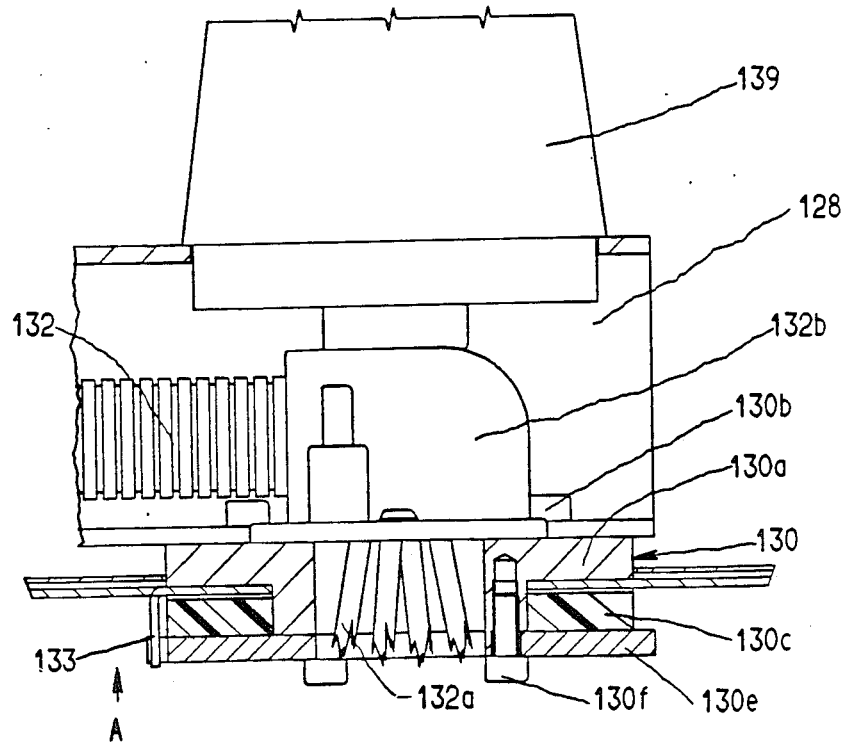
FIG. 8 is a sectional view of a component of the preferred embodiment.
Figure 10:
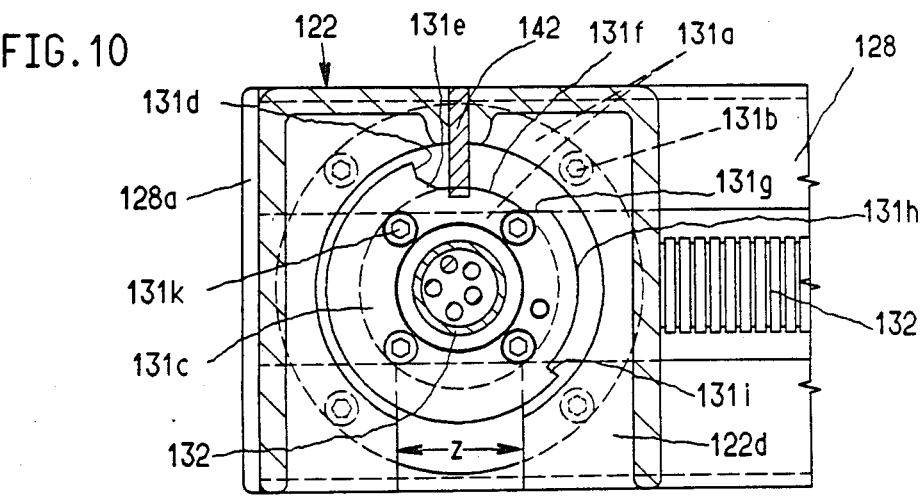
FIG. 10 is a sectional view taken along line X—X of FIG. 11.

The data display device H, as seen in FIGS. 6 and 7a, can be arrested by means of a clamping lever 150a at any location of its pivotal path by tightening the bearing member 148 with the pivotal bearing member 149. The rotation of the data display device H is limited by a lug 133 (FIGS. 7 and 8) or 133a (FIGS. 7a, 8a and 9) cut out of the upper wall of the bearing part 148 and bent with respect thereto. The lug 133 or 133a cooperates with abutment edges 130h of the abutment disc 130e. The supply cables 132a leading to the data display device H are placed in a protective hose 132 which is positioned in the carrier column 122 and the pivotal arm 128. The supply cables extending horizontally in the pivotal arm 128 are at their transition to the data display device H deflected in an angle member 132b as seen in particular in FIGS. 8 and 8a. As may be observed in FIGS. 10, 11 and 12, the tubular profile of the pivotal arm 128 is at its end face provided with a cover 128a. A signalling lamp 139 is mounted on the pivotal arm 128 coaxially with the rotary bearing 130. The legs 122a of the profile of the carrier column 122, closed off with a cover plate 122i (FIG. 13) are mounted by means of screw connection to the pedestal 90 (FIGS. 5, 13) of the machine bed 11.

Figure 11:
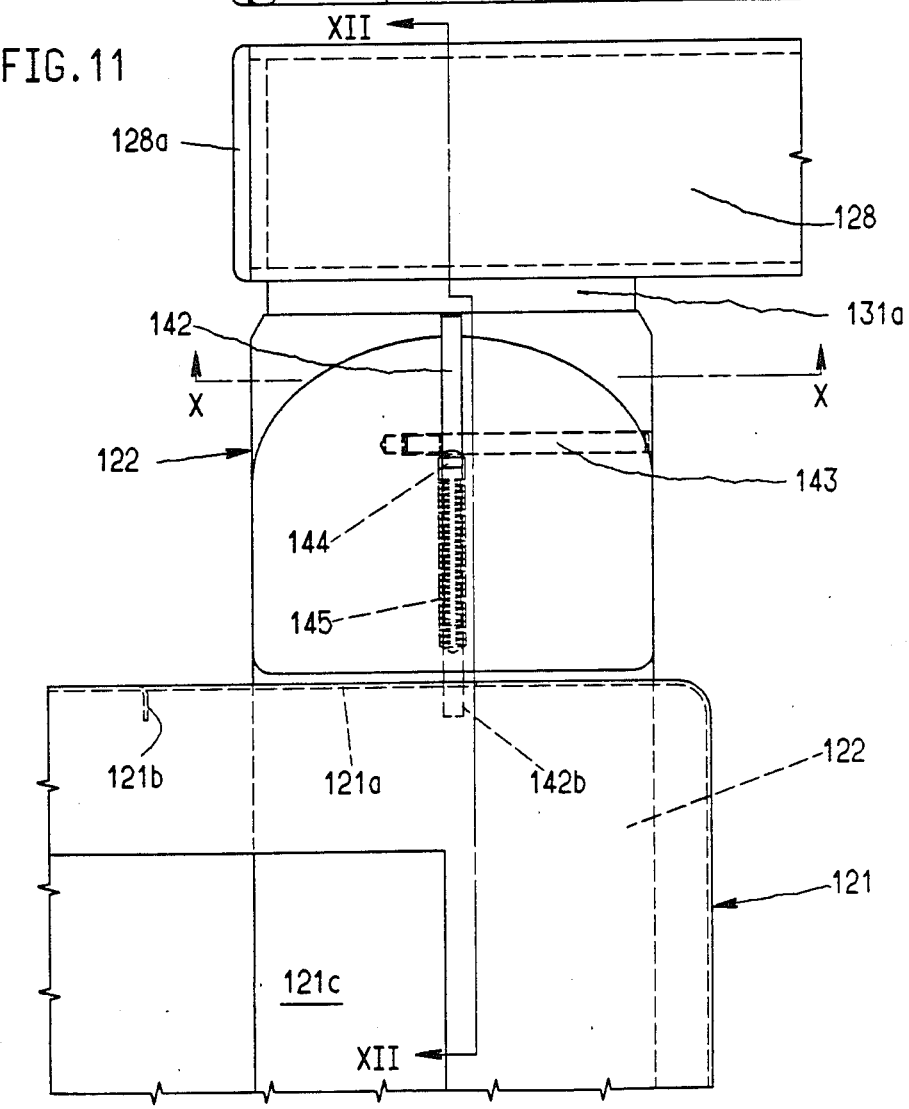
FIG. 11 is a schematic elevational view of a carrier and pivotal arm of the injection molding machine in the zone of a rotary support as viewed from the service side.

The carrier column 122 which has a U-shaped cross-sectional configuration has a terminal portion 122' of larger cross-sectional area, extending over a protecting door 121, as shown in FIGS. 11 and 12. In the terminal part 122' there is arranged a rotary bearing 131 for the pivotal arm 128 as well as a device L by means of which the protective door 121, shiftable parallel to the injection axis x—x, may be blocked.

The device L is designed such that a blocking is effected when the data display device H dwells in the path of the movement of the protective door 121. As seen in particular in FIG. 12, the front face of the carrier column 122 in the terminal portion 122' and the front face of the protective door 121 are situated in a common vertical plane. The remainder of the front face of the carrier column 122 lies in the vertical plane a—a (FIGS. 4, 12) of the service-side wall 11a of the machine bed 11 (FIGS. 4 and 5). The guide columns 147 rigidly connected with the protective door 121 slide in glide bushings 147a which are received in enlarged parts 122e of a web 122b as shown in FIGS. 12 and 13. The protective door 121 which is of steel sheet is provided on its front face with a viewing window 121c. The guide columns 147 are positioned at a distance from one another so that a secure guidance for the protective door 121 is obtained as shown in FIGS. 3 and 12. In the closed position the protective door 121 bounds a stationary carrier sheet member 127 which lies in the plane a—a and which serves a service keyboard 126 as shown in FIGS. 3 and 4.

The U-profile forming the terminal portion 122' of the carrier column 122 includes the web 122b' and the legs 122a'. At the upper end of the web and the legs there is formed an inner support flange 122d having horizontal gliding o faces 122d' on which the pivotal arm 128 is rotatably supported by means of a control disc 131c affixed to a bearing ring 131a which, in turn, is secured to the pivotal arm 128. A radial flange of the bearing ring 131a rotatably lies on the upper gliding surface 122d' and the control disc 131c rotatably lies on the lower gliding face 122d' as may be seen in FIG. 12. The legs 122a' are traversed by a frictional screw 155, by means of which the legs 122a' may be pre-tensioned. By virtue of such a pre-tensioning the inner, circular vertical sliding face 122d" (FIG. 12) of the bearing flange 122d is tightened with the corresponding sliding face of the bearing ring 131a and thereby the pivotal arm 128 is rotatable against frictional resistance in the pivotal bearing. In the vicinity of the web 122b' in the legs 122a' there is supported a shaft 143 (FIGS. 11, 12). A locking lever 142 of the device L is pivotally arranged on the shaft 143 in the symmetry plane of the carrier column 122. The locking lever 142 may be controlled by a control profile arranged at the circumference of the control disc 131c.

The locking lever 142, with its upper arm 142a engages the end face of the control profile under the effect of a spring 145 which is arranged in a vertical bore hole and engages the arm 142a by means of a piece 144. If the engagement edge of the locking lever 142 is in engagement along the portion 131f, as it is the case in FIGS. 10 and 12, the free end 142b of the locking lever 142 engages behind a lug 121b bent out perpendicularly from the edge 121a of the protective door 121. In the pivotal position shown in FIGS. 6, 10, 11 and 12, the pivotal arm 128 extends parallel to the vertical, service-side wall 11a of the machine bed 11, that is, it is parallel to the injection axis x—x. If, starting from such a pivotal position, the pivotal arm 128 is turned in the one or the other direction in order to move the data display device H into the operational position or the position of rest, the frontal edge of the lever arm 142a runs up onto the control edge 131e or 131g, respectively. These control edges form an angle of approximately 45° with the radial direction. By virtue of such a runup, the locking lever 142 is moved from a locking position according to FIG. 12 (solid-line showing) into a releasing position which is shown in broken lines in FIG. 12, before it runs up on one of the abutment edges 131d or 131i. The lever arm 142a engages the abutment edge 131d when the data display device H is in its position of rest and the lever arm 142a engages the abutment edge 131i when the data display device H is in the operational (working) position. Both limit positions are shown in FIGS. 4 and 5. The bearing flange 122d is not closed to a full circle but there remains a radial slot having an inner width z (FIG. 10) through which during installation the protective hose 132 may be introduced into the carrier column 122. The bearing ring 131a is secured to the pivotal arm 128 by means of securing screws 131b and the control disc 131c is secured to the bearing ring 131a by means of securing screws 131k.

To the carrier column 122 there is secured a protective cover 124 arranged in the plane a—a of the vertical wall 11a of the machine bed 11. The protective cover 124 extends up to the height of the data display device H when the latter is in the position of rest, in which the data display device H may be supported by the component 124. For this purpose, at the underside of the housing 129a, on a rectangularly bent upper edge of the protective cover 124, rubber bumpers 152 are arranged.

In the injection molding plants according to FIGS. 1 and 2, the injection molding machines are, on either side of a linear track 45, arranged in an end-to-end relationship. The injection molding plant includes a mold storage magazine 44, a roller table 49 for moving away the injection mold assemblies S as well as a station 50 for transporting away the collecting containers charged with the injection-molded articles. On the linear track 45 a vehicle (carriage) 27 may travel for transporting the injection mold assemblies S as well as the plasticizing cylinders 52 or other components of the injection molding machines. The vehicle 27 may move past the storage magazine 44 as well as the injection molding machines in an alternating manner into coupling positions for receiving or transferring the injection mold assembly S or a plasticizing cylinder 52 or other components.

The injection molding machines are arranged parallel relative to their injection axes x—x and are at such a distance from the track 45 that the above-noted coupling positions can be effected. The injection molding machines lined up on one side of the track 45 are in a mirror-image arrangement relative to the injection molding machines on the other side of the track 45. In this manner the rear sides of all the injection molding machines are oriented towards the track 45. In case the injection molding machines are of different size, the service sides b thereof have in each instance a different distance from the track 45. The vertical walls 11a of the machine beds 11 of the injection molding machines at the service side form, together with the protective covers 124, 17" as well as protective doors 17' and 121 (FIGS. 3, 4 and 5) a partition which separates the service zone E from a danger zone D, illustrated by shaded areas in FIGS. 1 and 2. The danger zone D encompasses the injection molding machines and the track 45. In case of two side-by-side arranged injection molding machine assemblies as shown in FIG. 1, the middle service alley E' is separated on either side from the danger zones D by the service-side vertical walls 11a and the circuitry cabinets 38 arranged between the ends of the injection molding machines. The injection mold changing devices illustrated in FIGS. 1 and 2 which are described in more detail in co-pending Karl Hehl U.S. patent application No. 51,387, filed May 19, 1987, are only described briefly as follows:

In the injection molding plant according to FIG. 1, at the rear side of each injection molding machine, there is arranged a changing table 19 movable parallel to the injection axis x—x to the extent of one mold depth in such a manner that the injection mold guide G' (FIG. 1) may form with a mold guide G in the mold clamping chamber F a mold replacement track. The injection mold guide G' of the changing table 19 may furthermore form with a mold guide G" of the vehicle 27 movable into the coupling position, a conveying track for the transfer of an injection mold assembly S from the changing table 19 onto the vehicle 27 and conversely. Furthermore, the mold guide G" of the vehicle 27 moved into the coupling position at the mold storage magazine 44 may form with a mold guide of a storage compartment 44a a conveyor track for the transfer of an injection mold assembly S from the storage compartment 44a onto the vehicle 27 and conversely. The same applies in case of a transport of plasticizing cylinders 52. The mold guide G" and a mold displacing device are rotatably held on a support plate of the vehicle 27 such that the vehicle 27 may be moved selectively to one of the injection molding machines in a coupling position on the one or the other side of the track 45.

In the example of an injection molding plant according to FIG. 2, the vehicle 27 serves simultaneously as a changing table having two emplacements which are formed on a rotatable carrier plate. The emplacements may be charged selectively with injection mold assemblies S or plasticizing cylinders 52. The mold guides G" of the vehicle 27' may form alternately with the mold guides G of the mold clamping space F or with guides $G^{IV}$ for the plasticizing cylinder 52 or with the mold guides G'" of the storage compartments 44a of the mold storage magazine 44 transporting tracks for the transfer of injection mold assemblies S or plasticizing cylinders 52.

In the grouping according to FIG. 1, at the left side, the vehicle 27 (shown in solid lines) is in the coupling position at a changing table 19 of an injection molding machine situated in the vicinity of the mold storage magazine 44. From the changing table 19 there has just been transferred an injection mold assembly S into the mold clamping space F of the injection molding machine and the mold assembly is thus in its working position. The replaced injection mold assembly is shown to be transferred from the second emplacement of the changing table 19 onto the vehicle 27 on a transporting track formed by the mold guide G' of the changing table 19 and the mold guide G" of the vehicle 27. Further, in FIG. 1 on the left-hand side, on the top, there is indicated in broken lines the position of the vehicle 27 when the latter is situated in a coupling position at one of the storage compartments 44a of the magazine 44.

In the grouping of injection molding machines according to FIG. 1, on the right-hand side there is shown in solid lines the vehicle 27 in a coupling position at a storage compartment 44a, while its mold guide G" forms a transporting track with the mold guide G''' of that storage compartment 44a. The injection mold assembly situated on the vehicle 27 is just starting its transfer motion to the storage compartment 44a. At the bottom of the right-hand side grouping according to FIG. 1, the vehicle 27 is shown in broken lines and is illustrated in a coupling position with the changing table 19 of the lowermost right-hand side injection molding machine. The new injection mold assembly is already situated in the mold clamping space F. The injection mold assembly to be transported away is shown just prior to its transfer from the second emplacement of the changing table 19 to the vehicle 27. The data display devices H of both injection molding plants are shown partially in the working position and partially in the position of rest. At some of the injection molding machines the working location of the service personnel is designated at P. In order to better illustrate the mirror-symmetry arrangement of the injection molding machines relative to the track 45, the containers 51 for the granular plastic material are also shown.

In the injection molding plant according to FIG. 2, the vehicle 27' also constitutes a changing table with two emplacements. The vehicle is, for replacing a plasticizing cylinder 52, moved into a coupling position at the mold guide $G^{IV}$ of an injection molding machine. The plasticizing cylinder is shown to be transferred from the injection molding machine on the guide $G^{IV}$ onto the mold guide of the adjoining emplacement of the vehicle 27'. After completion of the transfer, the carrier plate of the vehicle 27' is rotated as illustrated in FIG. 2 in broken lines so that the plasticizing cylinder 52' which is located on the other emplacement of the vehicle, and which has been moved from the magazine 44, may be moved into the injection molding machine. In FIG. 2, on the top, there is shown in broken lines the position of the vehicle 27' when it is located in a coupling position at the storage magazine 44 which also may receive plasticizing cylinders 52. The symmetry axis of the injection molding plant is shown at y—y.

Each injection molding machine of the injection molding plants shown in FIGS. 1 and 2 is associated with a circuit cabinet 38 accommodating an associated computer. These circuit cabinets 38 are arranged in each instance at the ends of the support faces M of the respective machine beds. In this manner, there is obtained an even further improved separation of the service zones E, combined into a safe and relatively free service alley E' corresponding to the length of the track 45, from the danger zone D as shown in FIG. 4. By virtue of such separation an accidental or unauthorized transposition of an operator from the service alley E' into the danger zone D is made significantly more difficult. Unauthorized or forbidden access to the injection molding units 117 or injection mold assemblies 17 (at the bottom on the left in FIG. 2) during operation is prevented by the protective covers 17", 124 as well as protective doors 17' and 121. It is noted in this connection that by virtue of a corresponding design of the control profile of the control disc 131c the protective door 121 may, to be sure, be moved from its closed position in case the data display device H is not dwelling in the motion path of the protective door. In such a case, however, upon opening the protective door, the associated injection molding machine is brought to a standstill by other safety devices as soon as the protective door has been moved a few centimeters out of its closed position.

The present disclosure relates to subject matter contained in Federal Republic of Germany Patent Application No. P 36 32 449.3 (filed Sept. 24th, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine having an injection axis and including
- a block-shaped machine bed having a generally rectangular, horizontal support face and a vertical side wall;
- an openable and closable mold closing unit mounted on said support face;
- an injection molding unit mounted on said support face and having a plasticizing cylinder and a carrier block including a drive aggregate for said injection molding unit;
- a computer;
- a data display device spaced from the computer and including an input keyboard accessible by operating personnel in a service location laterally adjacent the machine;
- a vertical slide panel mounted on said vertical wall;
- said vertical slide panel and said vertical wall constituting a partition separating a service zone from a danger zone of said machine; said service location being situated in said service zone;
- the improvement comprising
  - (a) a vertical carrier column supported adjacent said carrier block on said vertical wall and having slide bearings;
  - (b) a service keyboard mounted adjacent said protective slide panel;
  - (c) a protective door supported by said vertical carrier column and arranged for displacement in a travelling path on said slide bearings parallel to said injection axis; said protective door being arranged for shielding a frontal side of said injection molding unit; said protective door having a closed position in which said protective door is immediately adjoining said service keyboard; and
  - (d) a pivotal arm swingably secured to said vertical carrier column and carrying said data display device; said pivotal arm having a first position in which it holds said data display device in a position of rest vertically above said support face of said machine bed clear of said service zone and a second position being at an angle to said first position; in said second position said pivotal arm holding said data display device in a working position in said service zone.

2. An injection molding machine as defined in claim 1, wherein said data display device includes a housing having a height, a display screen adjacent said input keyboard and a rectangular frame surrounding said display screen and having a height being approximately the same as the height of said housing; further comprising a protective cover shielding said drive aggregate and having a horizontal top wall; in said position of rest said housing extends over said horizontal wall of said protective cover.

3. An injection molding machine as defined in claim 1, wherein said vertical carrier column has a U-shaped cross section and an end portion of enlarged cross-sectional area extending over an edge portion of said protective door; further comprising a rotary bearing received in said end portion and connected to said pivotal arm; and locking means for preventing said protective door from displacement when said data display device dwells in said travelling path; said locking means being received in said end portion of said vertical carrier column.

4. An injection molding machine as defined in claim 3, wherein said vertical carrier column, with the exclusion of said end portion thereof, has a frontal face being coplanar with said vertical side wall of said machine bed; and further wherein said end portion of said vertical carrier column and said protective door have respective coplanar front faces.

5. An injection molding machine as defined in claim 4, wherein said vertical carrier column has enlargements each provided with a throughgoing aperture and guide columns forming part of said protective door and passing through the apertures of said enlargements; further wherein said service keyboard has a carrier plate arranged coplanar with said vertical wall of said machine bed; in said closed position of said protective door said guide columns being situated immediately adjacent said carrier plate of said service keyboard.

6. An injection molding machine as defined in claim 3, further comprising an inner bearing flange forming part of said end portion of said vertical carrier column; said inner bearing flange having horizontal upper and lower slide faces; a rotary bearing ring affixed to said pivotal arm and having a radial flange slidingly engaging said upper slide face; and a control disc affixed to said bearing ring and being spaced therefrom; said control disc slidingly engaging said lower slide face.

7. An injection molding machine as defined in claim 6, further comprising a friction screw held in said end portion of said vertical support column wherein said end portion has opposite side walls; said inner bearing flange having a cylindrical slide face oriented perpendicularly to said horizontal upper and lower slide faces; said opposite side walls urging said cylindrical slide face into a frictional contact with said bearing ring in a tightened state of said friction screw for frictionally resisting swinging motions of said pivotal arm.

8. An injection molding machine as defined in claim 6, wherein said locking means comprises a horizontal pivot pin and a two-armed locking lever pivotally supported on said pivot pin; and a spring continuously urging said two-armed locking lever into engagement with said control disc; said two-armed locking lever being operated by said control disc.

9. An injection molding machine as defined in claim 1, further comprising a stationary protective cover extending coplanar with said vertical wall of said machine bed and being secured to said carrier column; said stationary protective cover extending vertically to a height level of said data display device; said data display device being supported on said stationary protective cover when said data display device is in said position of rest.

10. An injection molding machine as defined in claim 1, wherein said data display device includes a housing having a top wall; further comprising a rotary bearing connecting said data display device with said pivotal arm for rotation about a vertical axis; said rotary bearing including a bearing ring attached to said pivotal arm; an abutment disc attached to said bearing ring and a damping element situated between said abutment disc and said bearing ring; portions of said top wall of said housing being rotatably supported on said abutment disc with the interposition of said damping element.

11. An injection molding machine as defined in claim 10, wherein said abutment disc has abutment edges; further comprising a lug cut out of said top wall of said housing of said data display device; said lug cooperating with said abutment edges for limiting rotary motions of said data display device relative to said pivotal arm.

12. An injection molding machine as defined in claim 10, wherein said data display device has a front face; further comprising a horizontally extending pivot pin supporting said data display device for swinging motions; said pivot pin being oriented parallel to said front face of said data display device; and means for immobilizing said data display device in any angular position swung about said horizontally extending pivot pin.

13. An injection molding machine as defined in claim 12, further comprising a first bearing member affixed to said data display device; said horizontally extending pivot pin passing through said first bearing member; and a second bearing member rotatably supported in said rotary bearing and extending behind said damping element; said horizontally extending pivot pin being received in said second bearing member.

14. An injection molding machine as defined in claim 1, wherein said vertical wall of said machine bed has a horizontally bent upper marginal edge zone supporting said vertical carrier column.

15. An injection molding machines each structured as defined in claim 1, comprising
a mold storage magazine;
a mold changing system having
a linear track extending adjacent the injection molding machines and said mold storage magazine; the injection axis of each injection molding machine extending parallel to said track;
a carriage arranged for travel on said track to carry an injection mold assembly between the mold storage magazine and a selected said injection molding machine for assuming coupling positions therewith for a transfer of an injection mold assembly thereto or therefrom;
further wherein
the injection molding machines are arranged in an end-to-end series on both sides of said track in a mirror-symmetry orientation relative to said track;

said vertical walls of the machine beds, said vertical slide panels and said protective doors of the end-to-end arranged injection molding machines together constitute a plant partition separating a service alley from a danger area including the injection molding machines and said track.

16. An injection molding plant as defined in claim 15, wherein each said computer has a circuitry cabinet situated between two end-to-end arranged adjoining injection molding machines; each said circuitry cabinet having a front face forming part of said plant partition.

* * * * *